United States Patent [19]

Lockhart et al.

[11] Patent Number: 5,143,958
[45] Date of Patent: Sep. 1, 1992

[54] GELLABLE AQUEOUS COMPOSITION AND ITS USE IN ENHANCED PETROLEUM

[75] Inventors: Thomas P. Lockhart, San Donato Milanese; Giovanni Burrafato, Tavazzano, both of Italy

[73] Assignee: Eniricerche S.p.A. and Agip S.p.A., Milan, Italy

[21] Appl. No.: 499,682

[22] Filed: Mar. 27, 1990

[30] Foreign Application Priority Data

Mar. 31, 1989 [IT] Italy .................. 19970 A/89

[51] Int. Cl.$^5$ .................................. C09K 7/02
[52] U.S. Cl. ........................ 524/219; 524/237; 523/130; 166/294; 166/295; 106/194
[58] Field of Search ........... 523/130; 166/294, 295; 524/237, 219; 106/194

[56] References Cited

U.S. PATENT DOCUMENTS

| | | | |
|---|---|---|---|
| 3,615,794 | 10/1971 | Nimerick | 523/130 |
| 3,978,925 | 9/1976 | Clampith | 106/294 |
| 4,657,081 | 4/1987 | Hodge | 166/308 |
| 4,706,754 | 11/1987 | Smith | 166/295 |
| 4,722,397 | 2/1988 | Sydansk et al. | 106/294 |
| 4,917,186 | 4/1990 | Mumallah | 166/295 |

FOREIGN PATENT DOCUMENTS 0170893 2/1986 European Pat. Off. .
0251638 1/1988 European Pat. Off. .

*Primary Examiner*—Joseph L. Schofer
*Assistant Examiner*—Jeffrey T. Smith
*Attorney, Agent, or Firm*—Oblon, Spivak, McClelland, Maier & Neustadt

[57] ABSTRACT

The permeability of high-permeability zones in a oil reservoir can be reduced by using a gellable aqueous composition with delayed gelation.

The composition comprises:
a) water;
b) a high-molecular weight natural or synthetic water-soluble polymer cross-linkable by means of $Cr^{3+}$ ions;
c) a water-soluble inorganic $Cr^{3+}$ salt;
d) a gelation-retardant organic ligand definable by the formula:

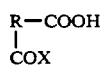

where:
R is a direct single bond, or a saturated or unsaturated linear or branched aliphatic hydrocarbon radical with from 1 to 6 carbon atoms, or a cycloalkyl radical with from 3 to 7 carbon atoms, or an aryl radical;
X is OH or OR' (where R' is an alkyl radical with from 1 to 5 carbon atoms), or NR"R''' (where R" and R''', which may be equal or different, are H or an alkyl radical with from 1 to 5 carbon atoms);
and relative water-soluble salts;

the polymer b) being present in a concentration of between 1000 and 50,000 ppm; the salt c) being present in a concentration of between 10 and 5000 ppm evaluated as metal; the polymer/$Cr^{3+}$ weight ratio varying from 1:1 to 1000:1; the molar organic ligand/$Cr^{3+}$ ratio varying from 0.5 to 500:1; the composition having a pH equal to or less than about 7.0.

13 Claims, No Drawings

GELLABLE AQUEOUS COMPOSITION AND ITS USE IN ENHANCED PETROLEUM

This invention relates to a gellable aqueous composition displaying delayed gelation, which is useful for reducing the permeability of high-permeability zones in an oil reservoir. The invention also relates to a method for reducing the permeability of said high-permeability zones using said gellable composition. The so-called primary recovery methods for petroleum make use of the natural energy of the reservoir or mechanical methods to produce petroleum from the reservoir through the wells; however, these methods are known to allow only partial extraction of the crude contained in a reservoir. To increase the petroleum quantity extractable from a reservoir it is therefore usual to employ secondary recovery techniques, consisting essentially of introducing into the reservoir a fluid, generally water or an aqueous polymer solution, which conveys the crude through the pores in the rock to the extraction well. However, because many reservoirs are composed of several types of rock having different permeability, the injected fluid tends to channel through the zones of greater permeability, without flushing or only partly flushing the zones of lesser permeability. This behavior can severly limit recovery of the petroleum in the reservoir.

To solve this problem, use is made of techniques, whose purpose is to reduce the permeability of the high-permeability zones. These techniques consist of partially or completely occluding said zones after extracting the crude contained in them, so as to deviate the flow of fluids subsequently fed into the reservoir towards the zones of lesser permeability, and so recover the crude contained in them. This occlusion can be implemented in various ways, many of which are based on feeding an aqueous solution of a gellable polymer into the reservoir through one or more wells, to form polymer gels in situ. The polymers normally used for forming these gels are water-soluble polymers cross-linkable by means of a polyvalent metal ion, generally $Cr^{3+}$.

As the zones to be occluded can be very large and/or at a more or less great distance from the injection well, the formation of the gel must be delayed in order to allow the gellable solution to reach the high permeability zones of the reservoir and to fill them substantially completely. To accomplish this, various methods for delaying the onset of gelling of the gellable solution are used. Thus, in one known method described for example in U.S. Pat. No. 3,785,437, an aqueous solution containing the cross-linkable polymer and a hexavalent chromium salt unable in itself to cross-link the polymer is injected into the reservoir. The chromium is then reduced to the trivalent state at a slow reduction rate by means of a reducing agent (such as thiourea or bisulphite) either contained in the gellable solution or injected into the reservoir in the form of an aqueous solution, subsequent to the injection of the gellable solution, so as to induce gelling upon mixing of the solution. The Cr(VI)/reductant method, has the advantage that it is possible to obtain delayed gelation with a one-component gellable composition; it has the drawback, however, of toxicity of hexavalent chromium and its consequent impact on the environment. In the case of sequential injection, the drawbacks include the incomplete mixing of the injected solutions, so that the gel forms only at their interface, and is therefore thin and easily deteriorates. U.S. Pat. No. 3,762,476 describes a gellable composition useful for correcting permeability in an underground reservoir, which comprises a cross-linkable polymer and a cross-linking agent in the form of an ion of a polyvalent metal complexed with certain ions having sequestering and delaying characteristics. According to the description of this patent, the solution of the complexed cross-linking agent is injected into the reservoir after injecting the polymeric aqueous solution, and thus the aforesaid drawbacks inherent in sequential injection are not overcome.

U.S. Pat. No. 4,683,949 describes gellable aqueous compositions useful in petroleum enhanced recovery which contain a water-soluble polyacrylamide and a cross-linking agent in the form of a $Cr^{3+}$ complex with a carboxylate ion, and more particularly an aliphatic monocarboxylic acid ion, especially an acetate ion. The use of this composition avoids the problems relative to sequential injection, however the resultant slow-down in cross-linking rate is only modest. Consequently these compositions are unsuitable for positioning the gel deeply within the reservoir, as is often desired in practice.

A new gellable composition with delayed gelation has now been found which is useful for reducing the permeability of high-permeability zones in an oil reservoir, and enables the aforesaid drawbacks to be obviated.

One aspect of the present invention is therefore a gellable aqueous composition useful in reducing the permeability of high-permeability zones in a oil reseroir. A further aspect of the present invention is a method for reducing the permeability of said zones using said composition.

In particular, according to the present invention, said aqueous gellable composition comprises:
a) water;
b) a high molecular weight natural or synthetic water-soluble polymer cross-linkable by $Cr^{3+}$ ions;
c) a water-soluble inorganic $Cr^{3+}$ salt;
d) a gelation-retardant organic ligand definable by the formula:

$$\begin{array}{c} \text{COOH} \\ | \\ \text{R} \\ | \\ \text{COX} \end{array} \qquad \text{I}$$

where:
R is a direct single bond, or a saturated or unsaturated linear or branched aliphatic hydrocarbon radical with from 1 to 6 carbon atoms, or a cycloalkyl radical with from 3 to 7 carbon atoms, or an alkyl radical;
X is OH or OR' (where R' is an alkyl radical with from 1 to 5 carbon atoms), or NR"R'" (where R" and R'", which may be equal or different, are H or an alkyl radical with from 1 to 5 carbon atoms);
and relative water-soluble salts;
the polymer b) being present in a concentration of between 1000 and 50,000 ppm (ppm=parts per million by weight); the salt c) being present in a concentration of between 10 and 5000 ppm evaluated as metal; the polymer/$Cr^{3+}$ weight ratio varying from 1:1 to 1000:1; the organic ligand/$Cr^{3+}$ molar ratio varying from 0.5 to 500:1; the composition having a pH equal to or less than about 7.0.

The polymer used in the composition of the present invention can be chosen from all natural and synthetic water-soluble polymers of high molecular weight which cross-link by the action of $Cr^{3+}$ ions. Synthetic polymers particularly suitable for the purposes of the present invention are acrylamide polymers.

The term "acrylamide polymers" means polyacrylamides, partially hydrolyzed polyacrylamides, and copolymers and terpolymers of acrylamide with copolymerizable monomers, such as the copolymers acrylamide-N-vinylpyrrolidone and sodium acrylamide-2-acrylamido-2-methyl-1-propanesulphonate. A polyacrylamide is defined as an acrylamide polymer having less than 1% of its amide groups hydrolyzed to carboxyl groups, and a partially hydrolyzed polyacrylamide is defined as an acrylamide polymer having more than 1% but less than 100% of its amide groups hydrolyzed to carboxyl groups.

Natural polymers suitable for the purpose are polysaccharides such as guar gum, xanthan gum, scleroglucan, hydroxyethyl cellulose, carboxymethyl cellulose and modified starches.

The weight average molecular weight of the polymer can vary from 100,000 to 20,000,000 and preferably from 200,000 to 12,000,000. The $Cr^{3+}$ salt used for cross-linking the polymer is a water-soluble inorganic salt, and can be chosen for example from chlorides, sulphates and nitrates.

The organic ligand which delays gelation is a compound definable by said formula I in which R and X have the aforesaid meaning, and is preferably a compound of formula I in which R is a direct single bond or a saturated or unsaturated linear or branched aliphatic hydrocarbon radical with from 1 to 6 carbon atoms, and X is OH or NR"R''', where R" and R''' have the aforesaid meanings.

Examples of organic ligands particularly suitable for the purposes of the present invention are: oxalic acid, adipic acid, malonic acid, maleic acid, fumaric acid, succinic acid and the monoamide of glutaric acid.

The polymer concentration in the gellable aqueous composition of the present invention can vary from 1000 to 50,000 ppm and preferably from 4000 to 30,000 ppm, the chromium salt concentration, expressed as metal, can vary from 10 to 5,000 ppm and preferably from 25 to 500 ppm, and the polymer/$Cr^{3+}$ weight ratio can vary from 1:1 to 1.000:1 and preferably from 5:1 to 500:1. The weight molar ratio between the gelation-retardant organic ligand and $Cr^{3+}$ to obtain a gelation retardant can vary from 0.5:1 to 500:1 and preferably from 5:1 to 100:1, depending both on the time by which gelation is to be delayed and on the particlar organic ligand used.

The acqueous gellable composition of the present invention has a pH within the gelation range for the composition, which can generally vary from about 2.0 to 7.0.

Consequently, when necessary or desired, the composition pH is adjusted by adding a mineral acid or base. Mineral acids suitable for the purpose are for example hydrochloric acid and perchloric acid. A suitable base is for example sodium hydroxide. A neutral or acid pH value is essential for inducing the gelation of the gellable compositions of the present invention. In this respect, at alkaline pH values colloidal chromium hydroxide precipitates, this being inactive for cross-linking purposes.

One of the advantages of the gellable aqueous composition of the present invention is that it allows the time of onset of gelling to be controlled over a wide range, generally from 1 day to 2 months or more.

For each organic ligand used, other conditions being equal, the onset of gelling of the composition will be generally more delayed the greater the molar ratio of organic ligand to $Cr^{3+}$. Although the mechanism by which the ligands of the present invention exercise their delaying effect on the gelation is not known with certainty, it is considered that this effect depends on the chemistry of their complexing with the $Cr^{3+}$ in solution.

In particular, it is considered that in the complexed or sequestered form, i.e. $Cr^{3+}$—L (L=ligand), the $Cr^{3+}$ is not available for reaction with the reactive carboxylic acid groups of the polymer chain, and therefore no gelation occurs. In accordance with this theory, the $Cr^{3+}$ becomes available for cross-linking only when the ligand L dissociates, as represented by the following equation:

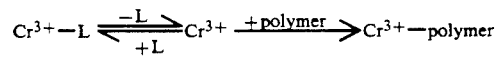

Basically, this implies that the rate of cross-linking depends strongly on the concentration and chemical nature of the particular ligand added to the gellable composition. While certain ligands, in particular those described in the present invention, are effective, others will be much less so, depending on the rate at which they release the $Cr^{3+}$ for cross-linking purposes. In this context it should be noted that the acetate ion is a weak complexing agent for $Cr^{3+}$ [in this respect see Irving H.N.M.H. "The XVth Proctor Memorial Lecture. Fact or Fiction? How Much Do We Really Know About the Chemistry of Chromium Today?", J. Soc. Leather Techn. Chemists (1974) 58, 51] and is therefore not effective in obtaining long delays in gelling at high temperature. As according to this mechanism the effect obtained by adding the ligand L is due to the formation of the $Cr^{3+}$—L complex, the invention can be implemented either by mixing the components in solution (as described in the following examples) or by furnishing the components c) and d) totally or partially, as a preformed complex.

Such preformed complexes include trivalent chromium, a ligand of formula I, and an ion usually selected from $Na^+$ or $K^+$ that serves to balance the electrical charge of the complex. Furthermore, the complex can contain other molecules, preferably water or pyridine. Examples of preformed complexes useful for the purpose of the present invention are:

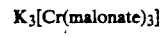

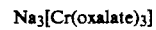

These complexes can be easily prepared according to standard procedures, for example as described in J. C. Chang, Inorganic Syntheses (1976) 16, 80–83; W. D.

Wheeler, Inorganic Chemistry (1982) 21, 3248; E. Deutsch, Inorganic Chemistry (1968) 7, 1532.

A further aspect of the present invention is a method for reducing the permeability of high-permeability zones in an oil reservoir, using said composition.

More particularly, according to the present invention the permeability of said high-permeability zones can be reduced by a method comprising the following stages:

1) preparing a gellable aqueous composition as heretofore described;
2) injecting said composition into the oil reservoir through the well;
3) causing said composition to flow within the reservoir until it reaches and substantially fills the high-permeability zone to be treated; and
4) allowing said composition to gel in situ within said zones.

The gellable aqueous composition can be prepared outside the reservoir by simply mixing its components b), c) and d) in water, however in practice aqueous solutions of the components are mixed together to obtain a final composition having the aforesaid characteristics.

The organic ligand in particular can be mixed with the other components as an aqueous solution of the free acid or as an aqueous solution of one of its water-soluble salts, generally a salt of an alkaline metal or of ammonium.

The order in which the components are mixed is not critical, however it is preferred to firstly prepare an aqueous solution of the polymer and organic ligand and then add the $Cr^{3+}$ salt solution. In the case of furnishing the c) and d) components as a preformed complex, the gellable aqueous composition can conveniently be prepared by mixing an aqueous solution of the complex to an aqueous solution of the polymer. Finally, if necessary or desired, the pH is adjusted by adding a mineral acid or an inorganic base. A buffer agent can also be added to the composition to stabilize the pH value, as described in our copending application. The composition prepared as hereinabove described, is then injected into the reservoir through the well and is made to flow, possibly under pressure, until it reaches and substantially fills the high-permeability zone which is to be treated.

The high-permeability zones in a reservoir can be of different types. They can for example be layers or irregularities (anomalies) within a homogeneous matrix of relatively low but uniform permeability, such as cavities or fractures.

Having reached the zone to be treated and having filled it substantially completely, the composition is left to gel within the zone to give rise to a compact, uniform gel which is stable under the reservoir conditions.

The method of the present invention therefore enables the permeability to be reduced in a simple and convenient manner without premature gelling occurring, even if the zone to be treated is situated at a great distance from the injection well.

It can also be advantageously applied where the reservoir conditions are such as would otherwise accelerate the gelling process, such as in the case of a high temperature reservoir. According to a preferred embodiment of the present invention, the reduction of permeability in high temperature reservoir ($T \geq 90°$ C.) is carried out by using a gellable aqueous composition in which the c) and d) components are furnished as a preformed complex.

The following examples are given for illustrative purposes only and must in no way be considered as limitative of the scope of the invention.

EXAMPLES 1-5

The gellable aqueous compositions of the following examples were prepared using an aqueous solution of a commercial polyacrylamide (1% hydrolyzed, weight average molecular weight 5,000,000–6,000,000), an aqueous solution of $Cr^{3+}$ choride or nitrate, and different-concentration solutions of the sodium salts of the following organic acids: oxalic acid, maleic acid, adipic acid, succinic acid, malonic acid.

In all the prepared samples the polyacrylamide concentration is 8000 ppm, the $Cr^{3+}$ concentration is 50 ppm (polyacrylamide/$Cr^{3+}$ weight ratio 160:1) and the binder/$Cr^{3+}$ molar ratio varies from 0.1:1 to 50:1, as shown in Table 1.

The samples are prepared in a test-tube fitted with a screw stopper, by mixing the polyacrylamide solution with the solution containing the organic binder and then adding the $Cr^{3+}$ chloride or nitrate solution.

Finally, the pH is adjusted to 5.5+0.2 by adding aqueous sodium hydroxide or hydrochloric acid.

Two comparison samples were also prepared, one containing only the polyacrylamide and chromium salt but no ligand, and the other containing acetic acid as organic ligand.

Table 1 shows the gelation times of each sample at different temperatures.

TABLE 1

| Organic ligand | Ligand/$Cr^{3+}$ molar ratio | Gelation time (days) | | |
|---|---|---|---|---|
| | | 25° C. | 60° C. | 85° C. |
| none | — | 1 | <0.5 | <0.5 |
| acetic acid | 1:1 | 1 | <0.5 | <0.5 |
| | 10:1 | 4 | <0.5 | <0.5 |
| | 50:1 | a | 11 | 3 |
| oxalic acid | 0.5:1 | 8 | 95 | 6 |
| | 1:1 | 74 | a | 4 |
| maleic acid | 0.5:1 | 3 | <0.5 | <0.5 |
| | 1:1 | 3 | 1 | <0.5 |
| succinic acid | 0.5:1 | 2 | <0.5 | — |
| | 1:1 | 7 | 1 | — |
| | 5:1 | 16 | 8 | — |
| | 10:1 | 157 | 122 | — |
| malonic acid | 1:1 | 8 | 8 | — |
| | 5:1 | 92 | b | — |
| adipic acid | 1:1 | 2 | 1 | 2 |
| | 5:1 | 20 | 6 | 2 |
| | 10:1 | c | 13 | 6 |
| | 25:1 | c | c | 8 | a = not yet gelled after 161 days
b = not yet gelled after 159 days
c = not yet gelled after 60 days

EXAMPLE 6

The procedure described in Examples 1–5 was followed, using the monoamide of glutaric acid (MAAG) as organic ligand. Different-concentration aqueous solutions of the monoamide were used such as to obtain samples of gellable aqueous compositions having a molar ligand /$Cr^{3+}$ ratio of 1:1, 5:1, 10:1 and 50:1 respectively.

Table 2 shows the gelation times for the samples at temperatures of 25°, 60° and 85° C.

TABLE 2

| Organic ligand | Ligand/$Cr^{3+}$ molar ratio | Gelation time (days) | | |
|---|---|---|---|---|
| | | 25° C. | 60° C. | 85° C. |
| MAAG | 1:1 | 1 | <0.5 | <0.5 |

TABLE 2-continued

| Organic ligand | Ligand/$Cr^{3+}$ molar ratio | Gelation time (days) | | |
|---|---|---|---|---|
| | | 25° C. | 60° C. | 85° C. |
| | 5:1 | 4 | 1 | <0.5 |
| | 10:1 | 8 | 4 | 1 |
| | 50:1 | a | 136 | 6 | a = not yet gelled after 161 days.

EXAMPLE 7

The procedure described in Examples 1-5 was followed using potassium acid phthalate as organic ligand such as to obtain a sample containing 8000 ppm of polyacrylamide, 50 ppm of $Cr^{3+}$ and a molar organic ligand/$Cr^{3+}$ ratio of 8:1.

The gelationtime for the sample at 60° C. was 81 days.

EXAMPLE 8

By mixing together an aqueous solution of polyacrylamide (1% hydrolyzed, weight average molecular weight 5,000,000–6,000,000), an aqueous $Cr^{3+}$ nitrate solution and three aqueous fumaric acid (organic ligand) solutions of different pH values, three samples were prepared in which the polyacrylamide concentration was 8000 ppm, the $Cr^{3+}$ concentration was 50 ppm, the ligand/$Cr^{3+}$ molar ratio was 7.8:1 and the pH was 3.15, 3.35 and 3.78 respectively. Table 3 shows the gelation times for the samples at 25° and 60° C.

TABLE 3

| Organic ligand | pH | Gelation time (days) | |
|---|---|---|---|
| | | 25° C. | 60° C. |
| fumaric acid | 3.15 | * | 28 |
| | 3.35 | * | 36 |
| | 3.78 | * | 15 |

* = not yet gelled after 81 days

EXAMPLE 9

Four aqueous gellable compositions were prepared by mixing an aqueous solution of a commercial 4,2% partially hydrolyzed polyacrylamide (5.000.000–6.000.000 weight average molecular weight) containing thiourea as a stabilizer, with an aqueous solution of the following preformed complexes: $K_3[Cr(malonate)_3]$, $Na_3[Cr(oxalate)_3]$, $Na[Cr(malonate)_2(H_2O)_2]$, and $Na[Cr(malonate)_2(Py)_2]$. All the prepared samples contained 10.000 ppm of polyacrylamide, 100 ppm of $Cr^{3+}$ and 5.000 ppm of thiourea, the molar rato ligand/$Cr^{3+}$ depending on the preformed complex which is used.

The pH of all samples was adjusted to 5±0.1 by adding aqueous sodium hydroxide or hydrochloric acid.

A comparison sample was also prepared employing $Cr(acetate)_3$.

The gelation time of each sample was determined at 90° C. and the results are given in Table 4.

TABLE 4

| Preformed complex | Gelation time (90° C.) (hours) |
|---|---|
| $K_3[Cr(malonate)_3]$ | 52 |
| $Na_3[Cr(oxalate)_3]$ | 165 |
| $Na[Cr(malonate)_2(H_2O)_2]$ | 45 |
| $Na[Cr(malonate)_2(Py)_2]$ | 45 |
| $Cr(acetate)_3$ | 0,12 |

EXAMPLE 10

A gellable aqueous composition was prepared following the procedure of example 9, using $K_3[Cr(malonate)_3]$ as a preformed complex.

A buffer agent (pyridine 0,02M) was employed to stabilize the pH value of the composition (pH 5). The gelation time determined at 90° C. was 5.5 days.

EXAMPLE 11

Two aqueous gellable compositions were prepared containing 10.000 ppm of a polyacrylamide of example 9, 100 ppm of $Cr^{3+}$ as a preformed complex with malonate ($K_3[Cr(malonate)_3]$), and non precomplexed sodium malonate in a molar ratio malonate/$Cr^{3+}$ of 0,5/1 and 1/1.

The gelification time of the two composition was, respectively 3,5 days and 4,5 days at 90° C.

EXAMPLE 12

The procedure of example 9 was followed using a 0,7% partially hydrolyzed polyacrylamide instead of a 4,2% partially hydrolyzed one, and $K_3[Cr(malonate)_3]$ as the preformed complex.

Two samples were prepared having, respectively, pH 4 and pH 5.

The gelation time at 90° C. is shown in the following table 5.

TABLE 5

| Preformed complex | pH | Gelation time (90° C.) (days) |
|---|---|---|
| $K_3[Cr(malonate)_3]$ | 4 | 8 |
| " | 5 | 5 ± 1 |

EXAMPLE 13

An aqueous gellable composition was prepared containing 10.000 ppm of a polyacrylamide of example 9, 5000 ppm of thiourea as a polymer stabilizer, 100 ppm of $Cr^{3+}$ as a preformed complex with malonate ($K_3[Cr(malonate)_3]$), and non precomplexed sodium malonate in a molar ratio malonate/$Cr^{3+}$ of 2/1. The pH of the composition was adjusted to 5 by adding aqueous hydrochloric acid.

The gelation time determined at the temperature of 120° C. was of 23,5 hours.

EXAMPLE 14

An aqueous gellable composition was prepared employing 10.000 ppm of a copolymer of acrylamide and 2-acrylamido-2-methyl-1-propanesulphonate (sodium salt), containing 75% of the acrylamide comonomer, 100 ppm of $Cr^{3+}$ as a preformed complex with malonate ($K_3[Cr(malonate)_3]$), and non precomplexed sodium malonate in a molar ratio malonate/$Cr^{3+}$ of 1/1. The pH of the composition was adjusted to 5 by addition of aqueous hydrochloric acid.

The gelification time of the composition at 120° C. was of 77 hours.

We claim:

1. A gellable aqueous composition for reducing the permeability of high-permeability zones in an oil reservoir, comprising:
   a) water;
   b) a high-molecular weight natural or synthetic water-soluble polymer cross-linkable by means of $Cr^{3+}$ ions;
   c) a water-soluble inorganic $Cr^{3+}$ salt;
   d) a gelation-retardant organic ligand definable by the formula:

$$\begin{array}{c} COOH \\ | \\ R \\ | \\ COX \end{array} \qquad I$$

where:
   R is a direct single bond, or a saturated or unsaturated linear or branched aliphatic hydrocarbon radical with from 1 to 6 carbon atoms, or a cycloalkyl radical with from 3 to 7 carbon atoms, or an aryl radical;
   X is NR"R"' (where R" and R"', which may be equal or different, are H or an alkyl radical with from 1 to 5 carbon atoms);
   and relative water-soluble salts;
the polymer b) being present in a concentration of between 1000 and 50,000 ppm (ppm=parts per million by weight); the salt c) being present in a concentration of between 10 and 5000 ppm evaluated as metal; the polymer/$Cr^{3+}$ weight ratio varying from 1:1 to 1000:1; the organic ligand/$Cr^{3+}$ molar ratio varying from 0.5 to 500:1; the composition having a pH equal to or less than about 7.0.

2. A composition as claimed in claim 1, wherein b) is an acrylamide polymer or a polysaccharide.

3. A composition as claimed in claim 2, wherein the acrylamide polymer is chosen from polyacrylamide, partially hydrolyzed polyacrylamide, and copolymers of acrylamide with copolymerizable monomers.

4. A composition as claimed in claim 2, wherein the polysaccharide is chosen from guar gum, xanthan gum, scleroglucan, carboxymethyl cellulose, hydroxyethyl cellulose and modified starches.

5. A composition as claimed in claim 1, wherein the polymer b) has a weight average molecular weight of between 100,000 and 20,000,000.

6. A composition as claimed in claim 5, wherein said polymer b) has a weight average molecular weight of between 200,000 and 12,000,000.

7. A composition as claimed in claim 1, wherein c) is a $Cr^{3+}$ salt chosen from chlorides, nitrates and sulphates.

8. A composition as claimed in claim 1, wherein d) is defined by formula I where R is a direct single bond or a saturated or unsaturated linear aliphatic hydrocarbon radical with from 1 to 6 carbon atoms, and X is NR"R"'.

9. A composition as claimed in claim 1, wherein the polymer b) is present in a concentration of between 4000 and 30,000 ppm, the salt c) is present in a concentration of between 5 and 500 ppm evaluated as metal, and the polymer/$Cr^{3+}$ weight ratio varies from 5:1 to 500:1.

10. A composition as claimed in claim 1, wherein the organic ligand/$Cr^{3+}$ molar ratio varies from 1:1 to 100:1.

11. A composition as claimed in claim 1, wherein the composition pH varies from about 2.0 to about 7.0.

12. A composition as claimed in claim 1, wherein the components c) and d) are furnished, totally or partially, as a preformed complex comprising trivalent chromium, a ligand of formula I, and ion selected from $Na^+$ or $K^+$, and optionally a molecule selected from water or pyridine.

13. A composition as claimed in claim 5, wherein component D is the monoamide of glutaric acid.

* * * * *